(12) United States Patent
Bhaskaran et al.

(10) Patent No.: US 9,007,395 B2
(45) Date of Patent: Apr. 14, 2015

(54) BIT RESOLUTION ENHANCEMENT

(75) Inventors: Vasudev Bhaskaran, Sunnyvale, CA (US); Nikhil Balram, Mountain View, CA (US); Sujith Srinivasan, Bangalore (IN); Sanjay Garg, Bangalore (IN)

(73) Assignee: Marvell World Trade Ltd. (BB)

( * ) Notice: Subject to any disclaimer, the term of this patent is extended or adjusted under 35 U.S.C. 154(b) by 1016 days.

(21) Appl. No.: 12/615,594

(22) Filed: Nov. 10, 2009

(65) Prior Publication Data

US 2010/0134496 A1    Jun. 3, 2010

Related U.S. Application Data

(60) Provisional application No. 61/118,735, filed on Dec. 1, 2008.

(51) Int. Cl.
| | |
|---|---|
| *G09G 5/02* | (2006.01) |
| *G09G 5/00* | (2006.01) |
| *G06K 9/46* | (2006.01) |
| *G06K 9/48* | (2006.01) |
| *G06K 9/62* | (2006.01) |

(Continued)

(52) U.S. Cl.
CPC ....... *G06T 5/002* (2013.01); *G06T 2207/10016* (2013.01); *G06T 2207/20012* (2013.01); *G06T 3/403* (2013.01)

(58) Field of Classification Search
USPC ......... 345/428, 596–605, 690, 581, 589, 611, 345/615, 619, 694–699; 382/264, 270, 275, 382/181, 190, 195, 199, 205, 224, 260, 261, 382/298–300; 348/571, 607, 618, 619, 708, 348/712, 713
See application file for complete search history.

(56) References Cited

U.S. PATENT DOCUMENTS 5,388,201 A * 2/1995 Hourvitz et al. ............... 715/794
5,587,927 A * 12/1996 Nagao et al. ................... 702/167

(Continued)

FOREIGN PATENT DOCUMENTS

EP      0 457 039 A2    11/1991

OTHER PUBLICATIONS

Theophano Mitsa et al.: Digital Halftoning Using a Blue Noise Mask, IEEE Int. Conference Acoustics, Speech, and Signal Processing, Toronto, Ontario, Canada Apr. 1991, vol. 4 , pp. 2809-2812.

(Continued)

*Primary Examiner* — Wesner Sajous
*Assistant Examiner* — Andrew Shin

(57) ABSTRACT

Devices, systems, apparatuses, methods, and other embodiments associated with bit resolution enhancement are described. In one embodiment, an apparatus includes logic configured to produce a high-resolution pixel from a low-resolution pixel. The apparatus includes logic configured to classify the high-resolution pixel as being in a smooth region of an image based on at least one of a gradient value and a variance value associated with the low-resolution pixel. The apparatus includes logic configured to selectively re-classify the high-resolution pixel as not being in the smooth region of the image based on a set of neighboring high-resolution pixels associated with high-resolution pixel. The apparatus includes logic configured to selectively filter the high-resolution pixel based on whether the high-resolution pixel remains classified as being in the smooth region of the image.

15 Claims, 11 Drawing Sheets

(51) Int. Cl.

| | | |
|---|---|---|
| *G06K 9/40* | (2006.01) | |
| *G06K 9/32* | (2006.01) | |
| *H04N 5/00* | (2011.01) | |
| *H04N 9/77* | (2006.01) | |
| *G06T 5/00* | (2006.01) | |
| *G06T 3/40* | (2006.01) | |

(56) References Cited

U.S. PATENT DOCUMENTS

| | | | |
|---|---|---|---|
| 6,038,576 | A | 3/2000 | Ulichney et al. |
| 6,731,822 | B1 | 5/2004 | Sobel et al. |
| 8,204,333 | B2 * | 6/2012 | Chiu ............................ 382/261 |
| 2006/0023794 | A1 * | 2/2006 | Wan et al. ................ 375/240.29 |
| 2006/0197993 | A1 | 9/2006 | Yamanaka et al. |
| 2007/0248280 | A1 * | 10/2007 | Winger ........................ 382/275 |
| 2008/0165206 | A1 * | 7/2008 | Wang ............................ 345/611 |
| 2009/0040246 | A1 | 2/2009 | Miyasaka |
| 2009/0087111 | A1 * | 4/2009 | Noda et al. .................... 382/238 |

OTHER PUBLICATIONS

Akira Taguchi et al.: "Bit-Length Expansion for Digital Images", 2008 International Symposium on Intelligent Signal Processing and Communications System (ISPACS2008) Swissotel Le Concorde, Bangkok, Thailand.

Scott Daly et al.: "Bit-Depth Extension Using Spatiotemporal Microdither Based on Models of the Equivalent Input Noise of the Visual System", in Proc. Color Imaging VIII, vol. 5008, Jan. 13, 2003, Santa Clara, California.

Shree K. Nayar et al.: "High Dynamic Range Imaging: Spatially Varying Pixel Exposures", IEEE Computer Society Conference on Computer Vision and Pattern Recognition, IEEE, 2000, vol. 1 pp. 472-479.

Scott Daly: "Key Human Visual System Components as Applied to Display Algorithms", Paper No. 65.4, pp. 1002-1005, SID 2008.

Scott Daly et al:: "Decontouring: Prevention and Removal of False Contour Artifacts", in Proc. Human Vision and Electronic Imaging IX, vol. 5259, pp. 130-149, San Jose, California Jun. 2004.

Patent Cooperation Treaty (PCT) International Search Report and Written Opinion from co-pening PCT International Application No. PCT/US2009/063827, having an International Filing Date of Nov. 10, 2009, with a date of mailing of Feb. 23, 2010.

Chun Hung Liu et al.: "Bit-Depth Expansion by Adaptive Filter", Circuits and Systems, 2008. ISCAS 2008. IEEE International Symposium on, IEEE, Piscataway, NJ, May 18, 2008, pp. 496-499.

Wonseok Ahn et al.: "Flat-Region Detection and False Contour Removal in the Digital TV Display", IEEE International Conference on Multimedia and Expo, 2005, ICME 2005, Amsterdam, The Netherlands, Jul. 6-8, 2005, IEEE Piscataway, NJ, pp. 1338-1341.

* cited by examiner

BIT RESOLUTION ENHANCEMENT

CROSS REFERENCE TO RELATED APPLICATIONS

This application claims the benefit of U.S. provisional application Ser. No. 61/118,735, filed on Dec. 1, 2008, which is hereby incorporated by reference.

BACKGROUND

Digital content stored on Blu-ray Discs (BD) or Digital Versatile Disks (DVDs) or provided by digital video transmissions via broadcast, cable, satellite or IP is usually represented with 8 bits per channel. In the red/green/blue (RGB) format, this corresponds to 8 bits for each of the three primary color components, Red (R), Green (G) and Blue (B). In the YCbCr format, this corresponds to 8 bits for luminance (Y), 8 bits for the chrominance component Cb, and 8 bits for the chrominance component Cr. Cb and Cr may be downsampled by 2 horizontally to create the 4:2:2 format and also vertically to create the 4:2:0 format.

The Human Visual System (HVS) can distinguish much more gray levels than the 256 levels offered by 8 bit data. Weber's Law states that the smallest step the eye can see is proportional to the absolute intensity, $\Delta I/I \approx 1.4$. This means the eye is more sensitive to changes in levels at lower gray levels and significant banding or contouring is visible when the steps are not small enough. In order to produce a smooth gray scale ramp from black to white that has no visible banding or contouring effects, at least 1024 levels are required, corresponding to a bit depth of 10 bits per channel.

In view of the above-mentioned characteristic of the HVS, mainstream display technologies like LCD, Plasma and DLP have increased their bit-depth to 10-bits or more per channel. Also, recent versions (e.g., v1.3, v1.4) of HDMI, the popular digital interface used by consumer electronics devices worldwide, support transfer of video content with bit depths greater than 8 bits per channel. HDMI is used to transfer multimedia content from various audio-visual (AV) source devices like Blu-ray players, DVD players and set top boxes (STBs) to digital TVs.

However, as mentioned previously, commonly used consumer video formats still use 8 bits per channel. In order to display this data on a 10-bit or higher display, a typical video processor or converter appends extra bits to a lower bit depth pixel. For example, a converter can append 2 bits onto an 8-bit pixel value to create a 10-bit pixel value. However, simply appending bits does nothing to prevent the appearance of contouring or banding in smooth regions with slow variations where the individual steps are visible to the human eye. Conventionally, dithering, blurring, and smoothing techniques attempted to increase bit depth while reducing contouring artifacts. However, unintentional blurring and other undesirable results typically occurred. Therefore, a better way of processing image data would be desirable which uses the additional bit-depth offered by new digital interfaces and digital displays, to display images that are free from contouring artifacts while preserving the sharpness and detail.

SUMMARY

In one embodiment an apparatus includes mapping logic configured to produce a "high-resolution" pixel from a "low-resolution" pixel. Here the terms "high-resolution" and "low-resolution" refers to the bit depth, (e.g., the number of bits used to represent the pixel). A pixel with 8 bits or less per component would usually be considered a "low-resolution" pixel while a pixel with 10 bits or more per component would usually be considered a "high-resolution" pixel. The apparatus includes contour segmentation logic configured to classify the high-resolution pixel as being in a smooth region of an image. The classification can be based on at least one of a gradient value and a variance value associated with the low-resolution pixel. The apparatus includes contour refinement logic configured to selectively re-classify the high-resolution pixel as not being in the smooth region of the image based on a set of neighboring high-resolution pixels associated with high-resolution pixel. The apparatus includes range adjustment logic configured to selectively filter the high-resolution pixel based on whether the high-resolution pixel remains classified as being in the smooth region of the image.

In another embodiment of the apparatus, the contour segmentation logic is further configured to calculate the gradient value based on change in pixel values in a line of pixels including the low-resolution pixel. The line of pixels is confined to a neighborhood of pixels in the image.

In another embodiment of the apparatus, the contour segmentation logic is further configured to calculate the variance value based on a difference amount between the low-resolution pixel and a set of related low-resolution pixels. The set of related low-resolution pixels is confined to the neighborhood of pixels in the image.

In another embodiment of the apparatus, the contour segmentation logic is further configured to classify the high-resolution pixel as being in the smooth region of the image upon determining that the gradient value exceeds a gradient threshold and that the variance value exceeds a variance threshold.

In another embodiment, a method includes enhancing a bit depth representation of image content from a lower bit depth representation to a higher bit depth representation. The method includes initially classifying pixels having the higher bit depth representation that are susceptible to producing a contouring artifact and then re-classifying one or more of the pixels having the higher bit depth representation as not being susceptible to producing the contouring artifact. The pixels are re-classified upon determining that selected pixels associated with the reclassified pixels are not susceptible to producing the contouring artifact. The method includes selectively filtering pixels having the higher bit depth representation that are classified as being susceptible to producing the contouring artifact to mitigate the contouring artifact.

In one embodiment of the method, initially classifying pixels having the higher bit depth representation comprises initially classifying the pixels having the higher bit depth representation as a function of gradient values and variance values associated with the pixels.

BRIEF DESCRIPTION OF THE DRAWINGS

The accompanying drawings, which are incorporated in and constitute a part of the specification, illustrate various example apparatus, methods, and other example embodiments described herein. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal

DETAILED DESCRIPTION

Figure 1:
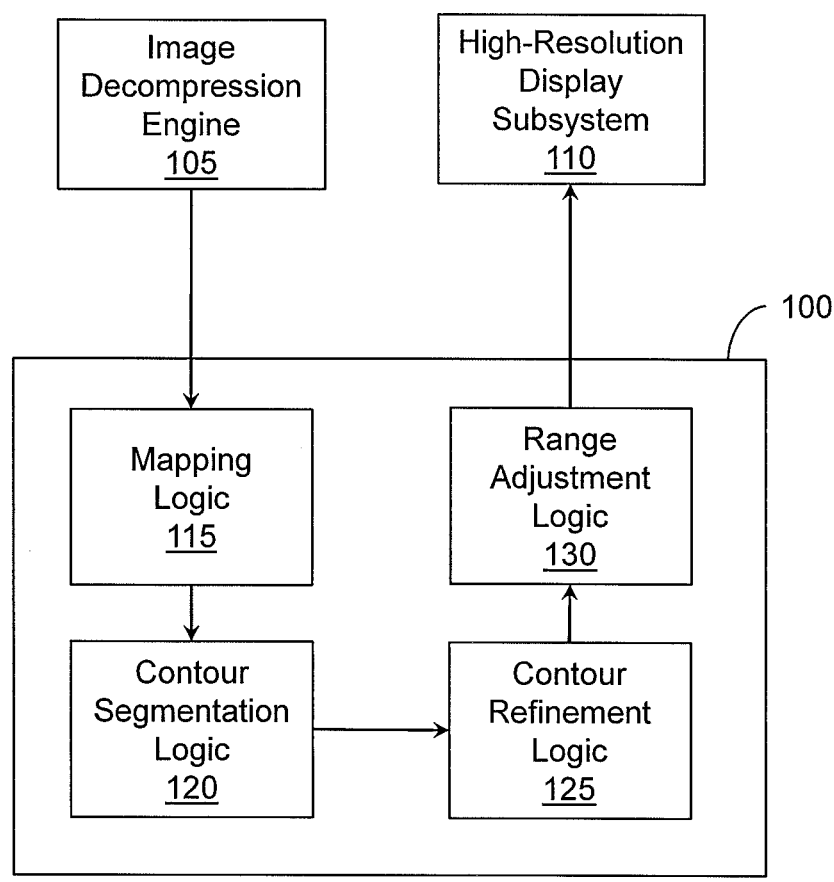
FIG. 1 illustrates an embodiment of an apparatus associated with enhancing bit depth representation of content from a low bit depth to a higher bit depth while accounting for contour artifacts.

This application describes apparatuses, methods, and other embodiments associated with enhancing pixel bit resolution while mitigating contour artifacts. In one embodiment, an apparatus 100 (FIG. 1) converts low-resolution pixels associated with digital video content to high-resolution pixels. A high-resolution pixel is represented by more bits than a low-resolution pixel. Low-resolution pixels can exhibit contour artifacts in smooth regions that have slow variations in gray levels. Apparatus 100 selectively adaptively filters pixels susceptible to producing a contouring artifact. In another embodiment, a method 700 (FIG. 7) identifies low-resolution pixels that may produce artifacts and selectively applies an adaptive filter to converted pixels to mitigate contour artifacts.

An image having a small tone scale such as 8 bits or less can be susceptible to quantization contour artifacts. These artifacts are noticeable in regions having spatially smooth intensity variations (e.g., sky, skin). The artifacts are also generally noticeable in large homogenous areas (e.g., walls, ceilings). The visibility of these artifacts is significantly increased with the current generation of large, high contrast, high brightness displays.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element, or limitation. Furthermore, repeated use of the phrase "in one embodiment" does not necessarily refer to the same embodiment, though it may.

"Computer-readable medium", as used herein, refers to a medium that stores signals, instructions, and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, and other media from which a computer, a processor or other electronic device can read.

"Logic", as used herein, includes but is not limited to hardware, firmware, software stored or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

FIG. 1 illustrates one embodiment of an apparatus 100 that is configured to convert low-resolution pixels into high-resolution pixels and to account for contour artifacts. A low-resolution pixel is represented by fewer bits than a high-resolution pixel. The low-resolution pixels may represent one image in a series of digital video images. Apparatus 100 operates on individual frames in a digital video image.

Apparatus 100 converts an array of pixels with p-bit precision (e.g., 8 bits) to a corresponding array of pixels with a higher q-bit precision (e.g., 10 bits). Mapping logic 115 performs the conversion. The array of pixels can be associated with, for example, graphics, synthetic image, text, and natural image content. Mapping logic 115 increases the bit depth of the array of pixels through one-to-one mapping schemes, additive noise approaches, and other techniques. One skilled in the art will appreciate from this disclosure and from the teachings herein that various mapping schemes and additive noise approaches may be employed. For example, the p-bit pixels can be zero-padded with q-p-bits to create q-bit pixels. The p-bits may be referred to as the p-bit signal while the q-bits may be referred to as the q-bit signal. For the sake of mathematical notation used below, p-bit pixels reside in a first set of pixels X and q-bit pixels reside in a second set of pixels Y. Mapping logic 115 can convert p-bit pixels into q-bit pixels (q>p) by scaling the X value according to:

$$Y = X \frac{2^q - 1}{2^p - 1}.$$

Mapping logic 115 then rounds the scaled value to fit into q-bits.

The mapping logic 115 maps low-resolution pixels (e.g., 8-bit pixels) to high-resolution pixels (e.g., 10-bit pixels) in a variety of ways. The mapping may include quantizing pixels, converting pixels, and other operations.

Apparatus 100 also includes contour segmentation logic 120, contour refinement logic 125, and range adjustment logic 130. Logics 120, 125, and 130 cooperate to modify the q-bit signals to make full use of the tonal range available for Y. The modification is determined adaptively based on neighborhood pixel values.

Contour segmentation logic 120 and contour refinement logic 125 operate on X to identify smooth regions where contouring artifacts are likely to occur. More specifically, contour segmentation logic 120 performs a first identification of the smooth regions as a function of variances and gradients. Contour refinement logic 125 refines the first identification based on neighborhood pixels. Refining which pixels are in smooth regions prevents one bit edges from being filtered. Identifying smooth regions distinguishes smooth regions from edges.

Range adjustment logic 130 filters pixels in Y that are identified by contour segmentation logic 120 and contour refinement logic 125 as belonging to a smooth region in X. The filtering mitigates contouring artifacts without blurring naturally occurring edge details. Thus, apparatus 100 increases the bit depth of pixels (e.g., from 8-bit low-resolution pixels to 10-bit high-resolution pixels) in the image using mapping logic 115. Apparatus 100 also identifies smooth regions in an image using contour segmentation logic 120 and contour refinement logic 125, and then selectively adaptively filters pixels that contribute to contour artifacts. The filtering is performed by range adjustment logic 130. In one embodiment, apparatus 100 can be configured to operate separately on individual color channels.

In one embodiment, the apparatus 100 receives a stream of low-resolution pixels from an image decompression engine 105 and provides a stream of high-resolution pixels to a high-resolution display subsystem 110. The image decompression engine 105 processes low-resolution pixels having fewer bits than the high-resolution pixels. In other embodiments, the apparatus 100 may receive low-resolution pixels from a device other than the image decompression engine 105 and/or provide high-resolution pixels to a device different than the high-resolution display subsystem 110. Those of ordinary skill in the art will appreciate from this disclosure and from the teachings herein that the low-resolution pixels may be received from a video processing pipeline (e.g., video decompression engine) as spatially and temporally converted pixels, enhanced pixels, or other pixels.

Figure 2:
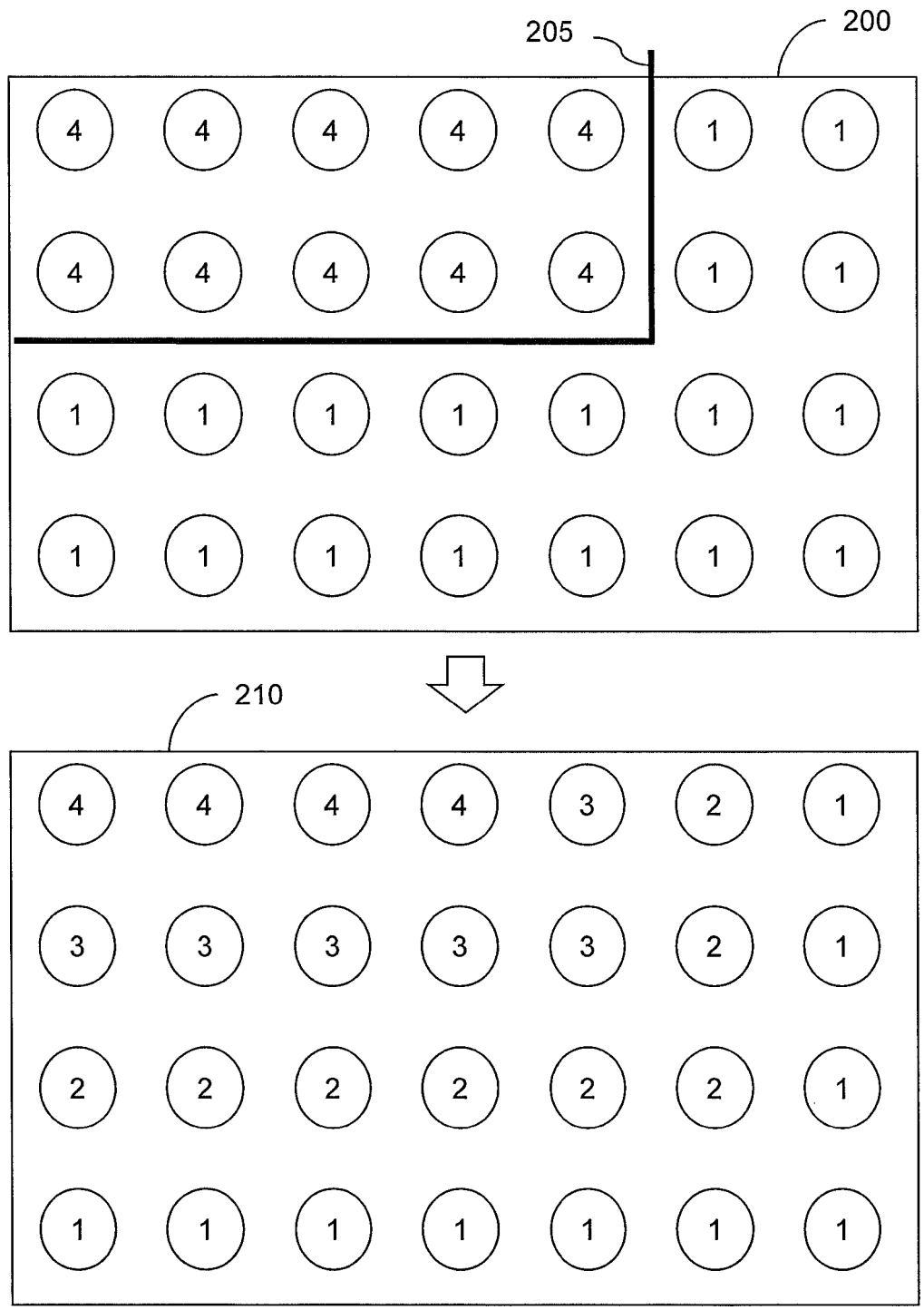
FIG. 2 illustrates one embodiment of how a contour artifact can be adaptively filtered out of a collection of high-resolution pixels.

FIG. 2 shows a portion of an array 200 of high-resolution pixels. The array 200 of high-resolution pixels was created from low-resolution pixels. Individual pixels in the array 200 are represented by circles. Pixel values appear in the center of the circles representing the pixels. When displayed, the array 200 will yield a contour artifact 205. The location of the contour artifact 205 is illustrated as a bold line in array 200. The contour artifact 205 marks the boundary between pixels having a value of 1 and pixels having a value of 4.

Apparatus 100 filters the array 200 of high-resolution pixels to create a new array 210 of high-resolution pixels. Recall that the array 200 of high-resolution pixels was created from an array of low-resolution pixels. The new array 210 does not contain the contour artifact 205. Smoothing pixels in array 200 facilitates removing the contour artifact 205 from the new array 210. For example, some pixels having a value of 1 are smoothed to become pixels having a value of 2 and some pixels having a value of 4 are smoothed to become pixels having a value of 3. The smoothing is performed using an adaptive low-pass filter.

In one embodiment, the apparatus 100 may process just a single color channel. Apparatus 100 may receive low-resolution pixels in YCbCr format. Thus, the contour segmentation logic 120 and contour refinement logic 125 can process luma channel data to make smooth pixel determinations. The luma channel may be, for example, a Y channel. The range adjustment logic 130 can filter chroma channels Cb and Cr based, at least in part, on the smooth pixel determinations.

Figure 3:
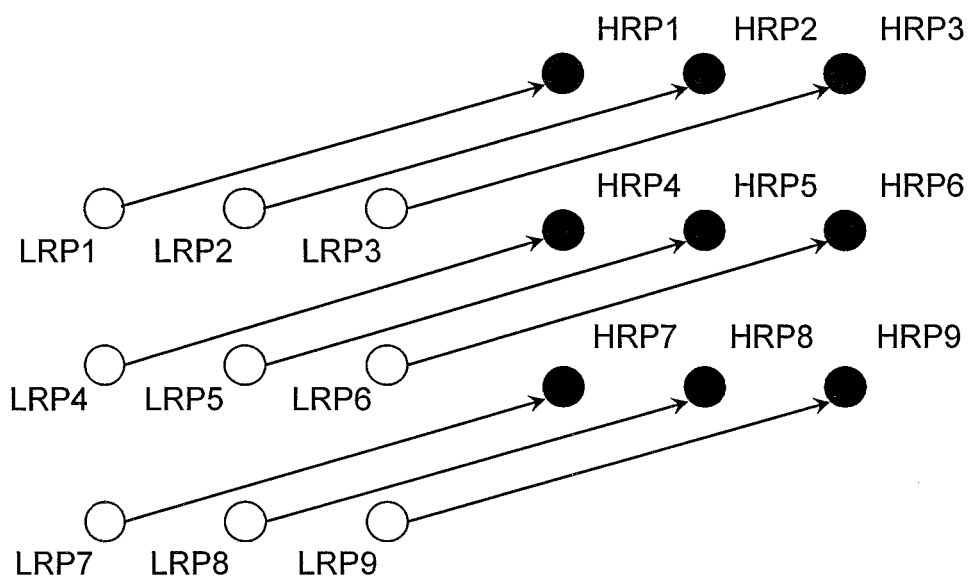
FIG. 3 illustrates one embodiment of how low-resolution pixels can be mapped to high-resolution pixels.

FIG. 3 illustrates mappings of low-resolution pixels LRP1-LRP9 to high-resolution pixels HRP1-HRP9. The mappings may be produced by, for example, mapping logic 115 of apparatus 100. The one-to-one correspondence is seen where LRP1 is mapped to HRP1, LRP2 is mapped to HRP2, and so on. The mapping can be performed using a lookup table, a hash function, dithering algorithms, half-toning algorithms, zero padding, and other approaches.

The contour segmentation logic 120 selectively labels some high-resolution pixels. The high-resolution pixels may be labeled "smooth" or "not smooth". The labels indicate whether a high-resolution pixel likely resides in a region where a contour artifact may appear. High-resolution pixels that are labeled "smooth" correspond to low-resolution pixels located in smooth regions of a lower bit depth image.

To perform the labeling of high-resolution pixels, the contour segmentation logic 120 determines whether a corresponding low-resolution pixel is in a smooth region of an image. The contour segmentation logic 120 determines whether a low-resolution pixel is in a smooth region in a variety of ways. In one embodiment, the contour segmentation logic 120 calculates a gradient value for a low-resolution pixel. The gradient value may indicate how rapidly pixel values are increasing in a line of pixels. The gradient value is calculated based, at least in part, on values of other low-resolution pixels around that low-resolution pixel. The contour segmentation logic 120 assigns a smooth label to a high-resolution pixel corresponding to the low-resolution pixel when the gradient value does not meet a gradient threshold. In other embodiments, the contour refinement logic 120 calculates variance values as well other values. A variance value indicates how greatly a pixel value differs from adjacent pixels. Contour segmentation logic 120 labels high-resolution pixels associated with low-resolution pixels based on the variance values and/or the gradient values.

Figure 4:
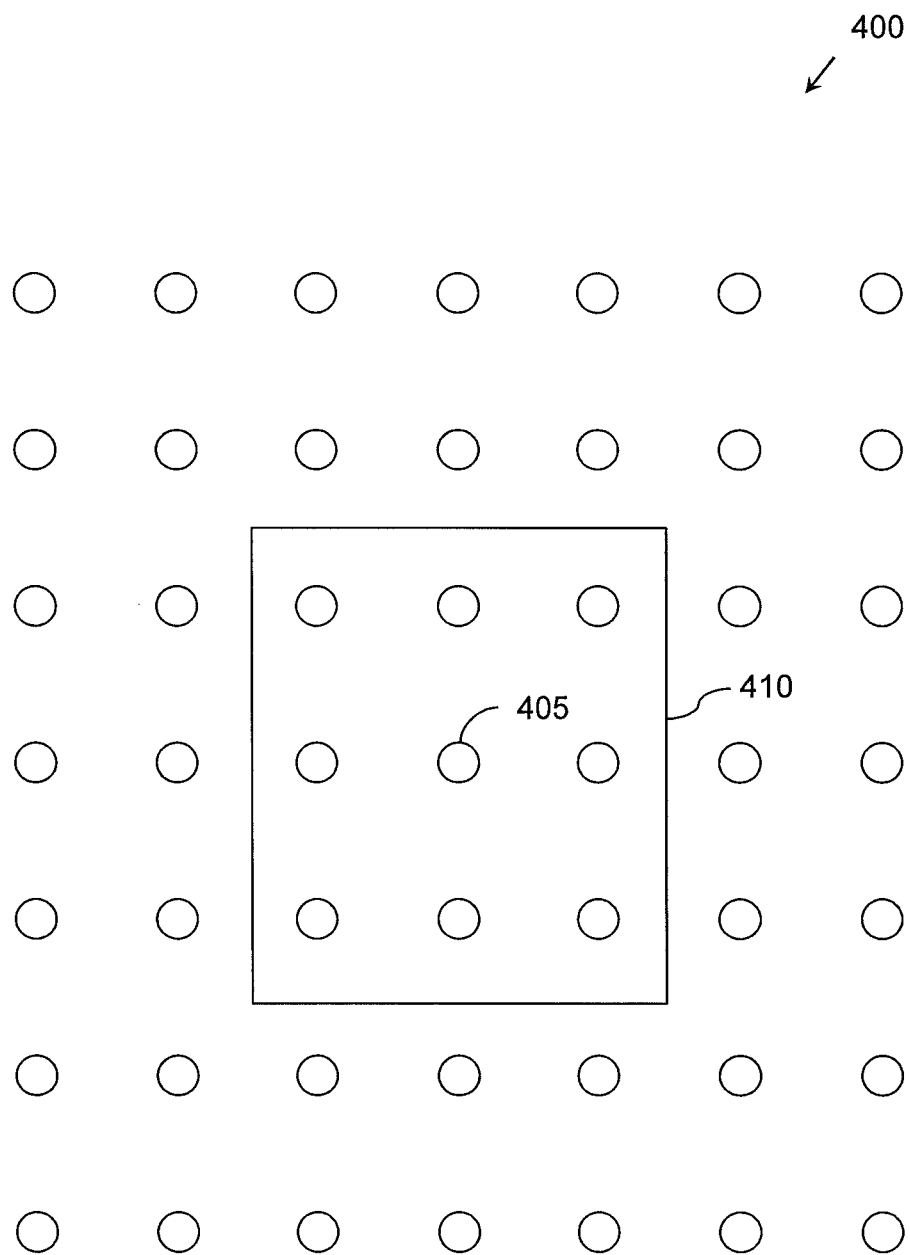
FIG. 4 illustrates a portion of an array of pixels.

FIG. 4 shows an example array 400 of low-resolution pixels. A gradient value for a low-resolution pixel 405 is calculated based, at least in part, on values of low-resolution pixels located in kernel 410. Kernel 410 is a group of pixels located near the low-resolution pixel 405. In FIG. 4, kernel 410 is a 3×3 array of pixels. One skilled in the art will appreciate from this disclosure and from the teachings herein that a gradient value may be based on other kernels having other shapes, sizes, and so on. For example, the kernel 410 does not have to be square. In one embodiment, when the low-resolution pixel 405 is represented as P(i,j), the kernel of pixels is defined by (2m+1)*(2m+1), where 'm' is an integer value. In one embodiment, m may be a user adjustable value.

Recall that a mapping of low-resolution pixels to high-resolution pixels occurs. "Smooth" high-resolution pixels corresponding to smooth low-resolution pixels can exhibit contour artifacts when displayed on a bright, high contrast display Noise represented in low-resolution pixel values can cause some high-resolution pixels to be labeled "smooth" even though not located in smooth regions of an image. The contour refinement logic 125 selectively detects mislabeled pixels and removes the "smooth" labels from these pixels. A smooth label is removed from a high-resolution pixel when at least one high-resolution pixel in a neighborhood of pixels around the high-resolution pixel is not labeled "smooth".

Figure 5:
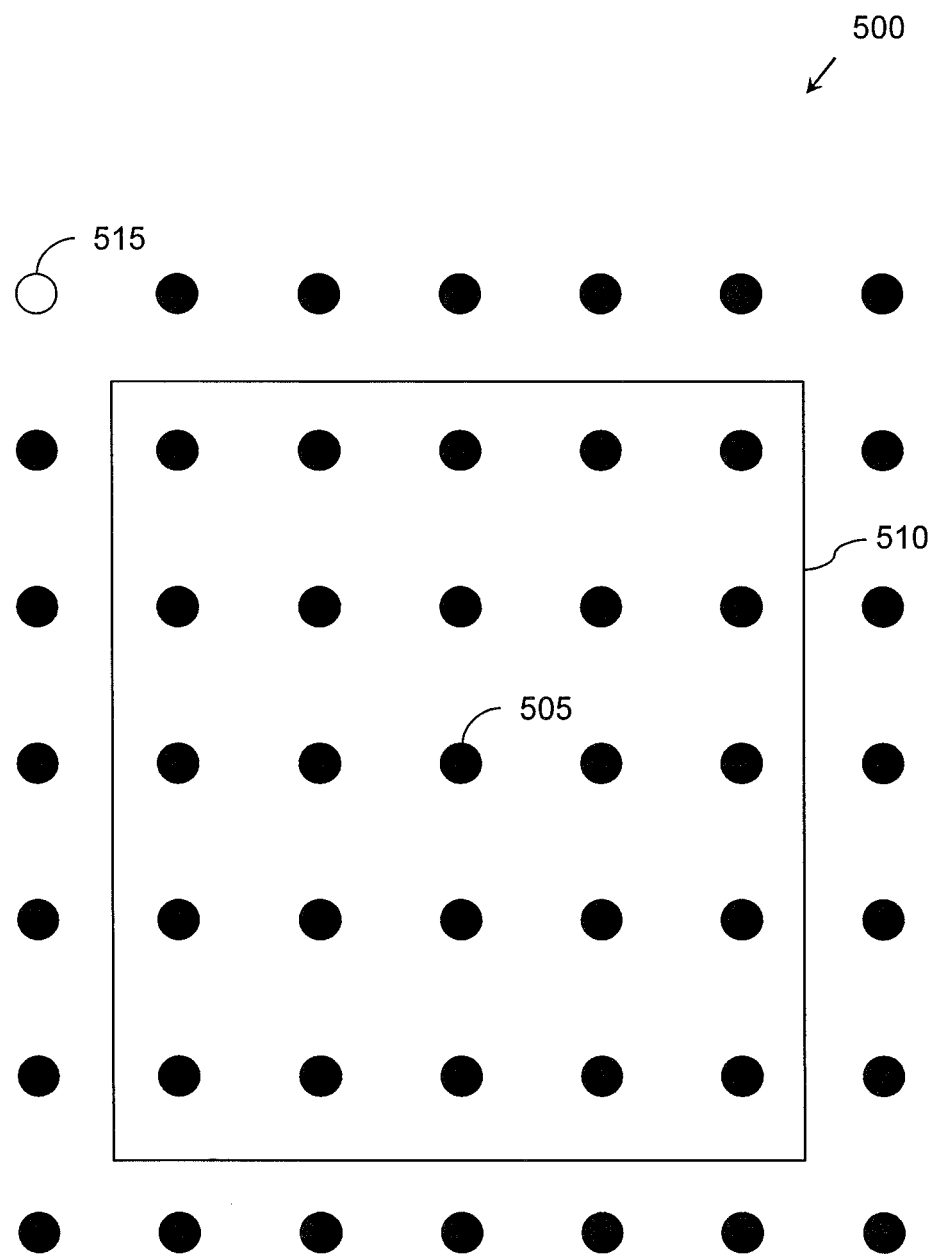
FIG. 5 illustrates a portion of an array of pixels.

FIG. 5 illustrates a portion of an array 500 of high-resolution pixels. To determine if a center pixel 505 is smooth, the contour refinement logic 125 examines a neighborhood 510 of high-resolution pixels. In FIG. 5, high-resolution pixels labeled "smooth" are shown as filled in circles. Pixel 515 is not labeled "smooth" and thus is shown as an unfilled circle. All the pixels in the neighborhood 510 are labeled "smooth". Therefore, contour refinement logic 125 would not remove the "smooth" label from the center pixel 505. However, if a high-resolution pixel in neighborhood 510 was not labeled "smooth", then the contour refinement logic 125 would remove the "smooth" label from the center pixel 505. Selectively removing labels facilitates preserving edge details while removing contour artifacts. In one embodiment, when the center pixel 505 is represented as P(i,j), the neighborhood 510 of pixels is defined by (2n+1)*(2n+1), where 'n' is an integer value. In one example, n may be a user configurable value. One skilled in the art will appreciate from this disclosure and from the teachings herein that other neighborhoods of other sizes and shapes may be employed.

Range adjustment logic 130 selectively increases the actual bit depth (e.g., number of gray levels used) of high-resolution pixels. The actual bit depth is increased by filtering high-resolution pixels that were labeled "smooth". Range adjustment logic 130 can filter high-resolution pixels using a low-pass filter, an averaging filter, or another filter. In one embodiment, high-resolution pixels that are labeled "smooth" and that are located around a center pixel may be used to determine whether and how to filter a center pixel.

Figure 6:
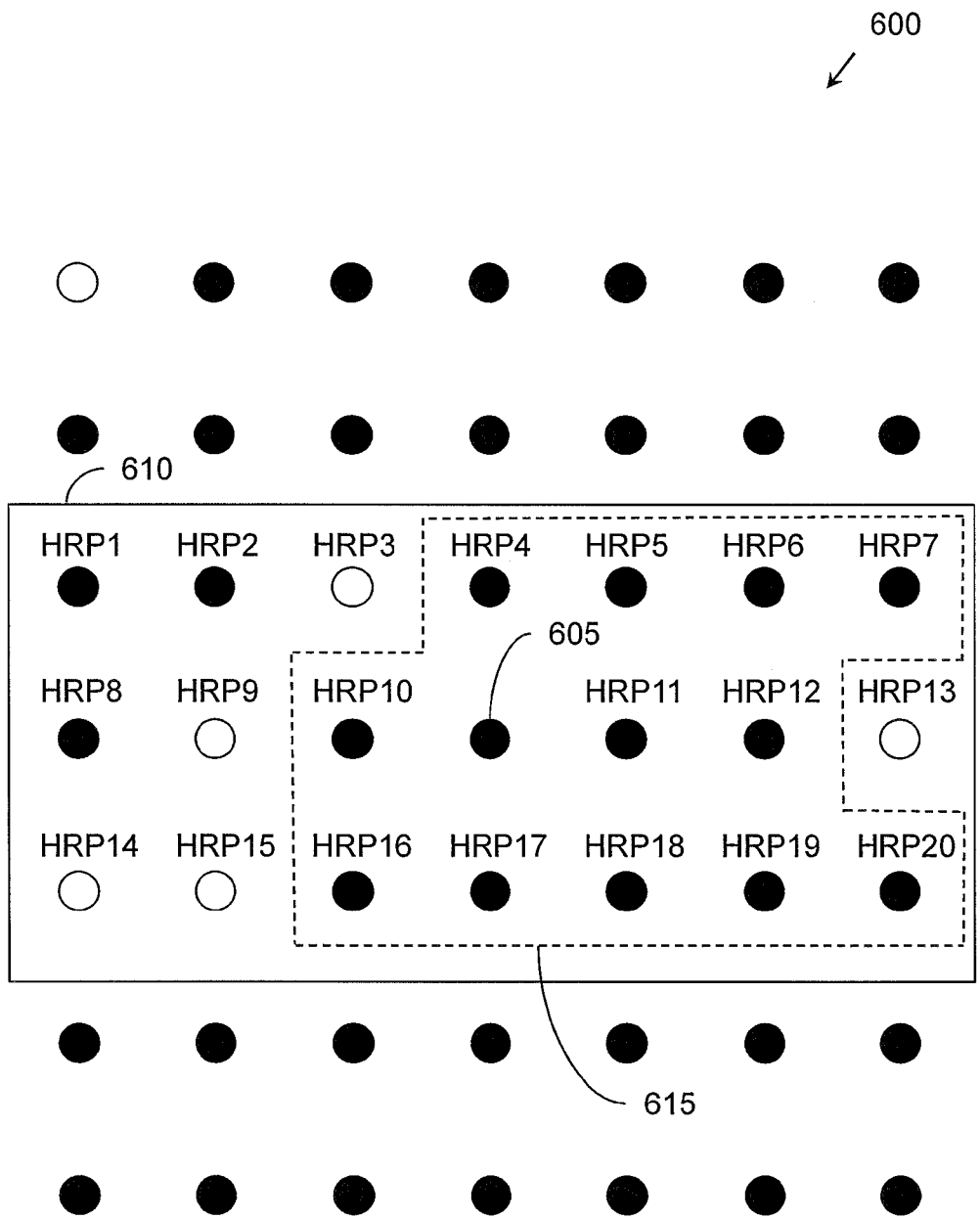
FIG. 6 illustrates a portion of an array of pixels.

FIG. 6 illustrates an array 600 of high-resolution pixels having a center pixel 605. Center pixel 605 is surrounded by a filter kernel 610 of other high-resolution pixels. Filter kernel 610 includes twenty high-resolution pixels HRP1-HRP20. Note that the filter kernel 610 does not have to be square. Center pixel 605 is filtered based on the values of high-resolution pixels HRP1-HRP20. One skilled in the art will appreciate from this disclosure and from the teachings herein that the filter kernel 610 may contain different numbers of high-resolution pixels and that the filter kernel 610 size may be programmable.

Range adjustment logic 130 filters the center pixel 605 based, at least in part, on the label (e.g., "smooth", "not smooth") associated with high-resolution pixels adjacent to the center pixel 605. While a label "smooth" or "not smooth" is described, one skilled in the art will appreciate that a binary value (e.g., 0, 1) may represent one of these labels.

In one embodiment, the center pixel 605 is filtered using values found in lines of adjacent high-resolution pixels. The lines of adjacent high-resolution pixels include the center pixel 605. A line of adjacent high-resolution pixels comprises up to two straight line segments oriented in different directions. For example, in FIG. 6, the center pixel 605 and high-resolution pixel HRP4 form a vertical line of two high-resolution pixels. This line of pixels continues in a second, horizontal line segment to the right. The line extends from high-resolution pixel HRP4 to high-resolution pixel HRP5, then through high-resolution pixel HRP6 to high-resolution pixel HRP7. This horizontal line of pixels does not extend horizontally to the left because high-resolution pixel HPR3 is not labeled "smooth" (as indicated by HRP3 not being filled in). Another line segment extends horizontally to the left from the center pixel 605 to high-resolution pixel HRP10. This horizontal line segment does not continue horizontally from high-resolution pixel HRP10 to pixel HRP9 because high-resolution pixel HRP9 is not labeled "smooth". However, a line segment may extend vertically down from high-resolution pixel HRP10 to high-resolution pixel HRP16 because high-resolution pixel HRP16 is labeled "smooth".

How the lines are used to filter a pixel is now described. A pixel may be filtered using a low-pass filter, an averaging filter, a digital filter, or another filter. In one embodiment, the filter is an adaptive low-pass filter. The filter is configured to filter selected smooth pixels using values of sequences of adjacent smooth pixels. The sequences of adjacent selected smooth pixels begin at a current pixel and resemble the lines of adjacent high-resolution pixels in connection with FIG. 6.

In one embodiment, a filter computes a filter output, $Y_d'(i, j)$ using a low-pass filter (LPF). The filter locates a center pixel to be filtered. The center pixel is located in an array of pixels at $(i, j)$. The filter can apply the low-pass filter to "x" pixels to the left of the center pixel and to "x" pixels to the right of the center pixel. The actual number of pixels filtered varies from row to row within a filter kernel based on whether the neighboring pixels are in a smooth region as determined, at least in part, by the lines. The low-pass filter can be adaptive in the horizontal direction. The low-pass filter width can be adapted according to the following algorithm:

1. For each $i0 = -k$ to $k$,
2. Find $j0\_right(i0)$, as the maximum value of $j0$ in the range $[0, x]$ such that $smooth(i+i0, j+j0)=1$ and $smooth(i+i0, j+j0+1)=0$.
3. Find $j0\_left(i0)$, as the maximum value of $j0$ in the range $[-x, 0]$ such that $smooth(i+i0, j-j0)=1$ and $smooth(i+i0, j-j0-1)=0$.

The filter output $Y_d'(i,j)$ is then calculated according to:

$$Y_d'(i, j) = \sum_{i0=-k}^{k} \sum_{j0=-j0\_left(i0)}^{j0\_right(i0)} Y_d(i+i0, j+j0) LPF(i0, j0)$$

Example methods may be better appreciated with reference to flow diagrams. While the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 7:
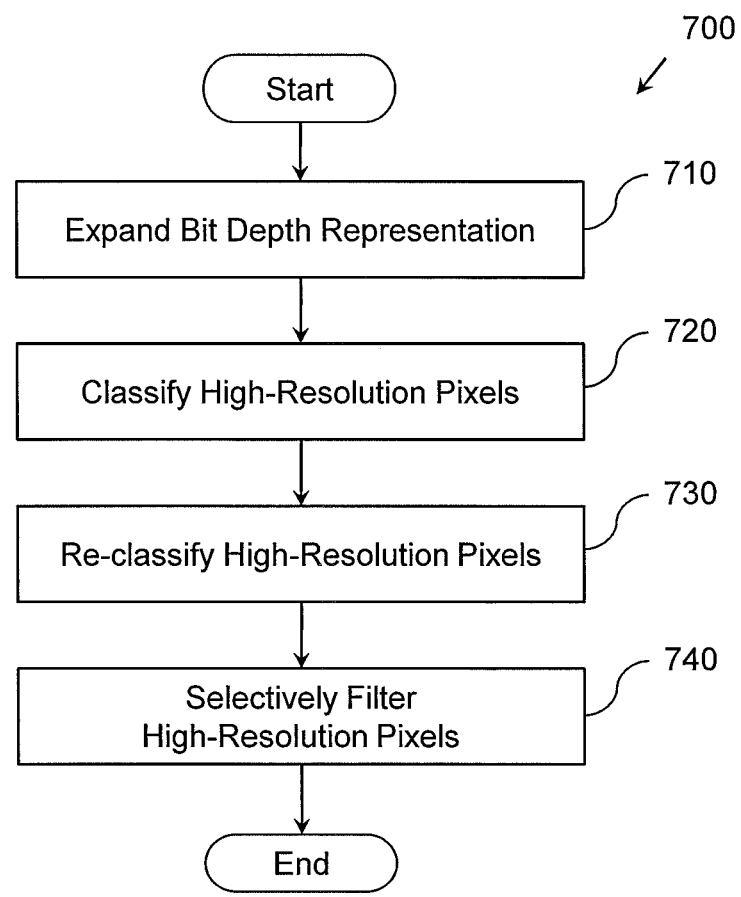
FIG. 7 illustrates an embodiment of a method associated with enhancing bit depth representation of content from a low bit depth to a higher bit depth while accounting for contour artifacts.

FIG. 7 illustrates a method 700. Method 700 is associated with increasing pixel bit depth resolution while avoiding contouring artifacts. The method 700 selectively filters pixels in smooth regions of the image to remove contour artifacts. Pixels representing smooth regions are filtered because contour artifacts generally appear in smooth regions of an image.

At 710, method 700 expands a bit depth representation. Expanding the bit depth representation can involve appending bit values to low-resolution pixels to create high-resolution pixels. In one embodiment, the low-resolution pixels may be received from a decompression engine as 8-bit pixels. The 8-bit pixels would be appended with two bits to create 10-bit pixels. The 10-bit pixels would then be in a format suitable for display by a high-resolution display. One skilled in the art will appreciate from this disclosure and from the teachings herein that other techniques may be employed to expand bit depth representation and that other bit depths may be processed. The process of accepting an image with a lower bit depth and producing an image with a higher bit depth by expanding the bit depth representation may be referred to as computing a dither augmented image.

At 720, certain high-resolution pixels are selectively classified as being in a smooth region. The selective classification is a function of computed gradients and computed variances that detail the degree to which pixel values change between adjacent pixels.

Noise represented in low-resolution pixel values may have caused some high-resolution pixels to be labeled as smooth when the high-resolution pixels are not actually in smooth regions of the image. Therefore, at 730, high-resolution pixels that were originally classified as being in a smooth region may be selectively re-classified as not being in a smooth region. The re-classification is a function of the values of other pixels in a neighborhood.

At 740, high-resolution pixels that are still classified as being in a smooth region are processed through an adaptive low pass filter. The adaptive low-pass filter functions to increase the real bit depth of the filtered high-resolution pixels and to blend smooth regions of the image. The blending uses the availability of extra gray levels in the expanded bit depth representation to remove contour artifacts.

In other embodiments, method 700 may include other actions. For example, method 700 could include calculating gradient values and variance values. The gradient values and variance values may be analyzed when classifying pixels at 720 and/or when re-classifying pixels at 730. A gradient value indicates how rapidly pixel values are increasing in a line of pixels. A variance value indicates how greatly a pixel value differs from adjacent pixels. These values are calculated by processing low-resolution pixels. In one embodiment, the gradient and variance values for a pixel are calculated from a kernel of pixels surrounding the pixel.

An image can have smooth regions and edge regions. Smooth regions are regions in which the values of adjacent pixels do not change quickly and/or significantly. Gradient values and variance values facilitate identifying whether a pixel is in a smooth region or in an edge region. If a low-resolution pixel is in a smooth region, then method 700 classifies the corresponding high-resolution pixel as also being in a smooth region. Whether a low-resolution pixel is determined to be in a smooth region can be a function of whether a gradient value associated with the low-resolution pixel meets a gradient threshold and whether a variance value associated with the low-resolution pixel does not meet a variance threshold. In one embodiment, the gradient threshold and/or the variance threshold can be dynamic and user configurable.

It will be appreciated that the methods described herein may be implemented as computer executable instructions embodied and stored on a computer-readable medium. When executed by a machine (e.g., processor, device) the instructions cause the machine to perform the methods herein and their equivalents. The methods may be implemented in a semiconductor chip. The methods can also be implemented with circuits and/or hardware logic.

Method 700 may operate on low bit depth content having p-bits per pixel per color component and augmented bit depth content having q-bits per pixel per color component, q being greater than p. For the sake of the following mathematical description, Y is a 2-D image having p-bit pixel values.

At 710, method 700 may receive pixels having a p-bit representation (e.g., 8 bits) and produce a bit depth expanded representation (e.g., 10 bits). A dither augmented image $Y_d$ can be produced, where, $Y_d = Y \times 2^{(q-p)} + d$. By way of illustration, if p=8 and q=10, then d is a 2×2 matrix with the values 0, 1, 2 and 3. One skilled in the art will appreciate from this disclosure and from the teachings herein that instead of a matrix, the output of a random number generator whose values are restricted to the range $[0, (2^{(q-p)}-1)]$ can be used. $Y_d$ has q-bits per pixel representation. If the initial representation had gently varying smooth regions, then $Y_d$ will likely exhibit contouring artifacts.

Method 700 classifies pixels at 720 and re-classifies pixels at 730 based, at least in part, on contour segmentation. Contour pixels in $Y_d$ are identified and labeled. Attempting to remove contours without first identifying the contours conventionally leads to unnecessary image blurring. Contours appear where there are similar pixel values while edges appear where neighboring pixels have large differences. The lower bit-depth (p-bit) image is examined to locate contour regions since small differences in adjacent pixels in the lower bit-depth (p-bit) image can be very large in the higher bit-depth (q-bit) image.

In one example, contour segmentation of Y into smooth regions that are likely candidates for having contour artifacts and non-smooth regions is computed according to:
a) For each Y pixel located at (i,j), compute the local gradient $|Y(i,j)-Y(k,l)|$ for all (k,l) within the (2 m+1)×(2m+1) neighborhood centered on the pixel at location (i,j)
b) Compute the variance of the pixel located at (i,j) relative to the pixels within the m×m neighborhood centered on the pixel at location (i,j).
c) If all the local gradients computed in a) are less than a threshold T1 and if all the variances computed in b) are less than a threshold T2, then the Y pixel located at (i,j) is identified as being in a smooth region Method 700 also performs contour segmentation refinement at 730. Pixels that were identified as being in a smooth region are candidates for producing contouring artifacts. The initial identification may be inaccurate due to noise. Therefore, in one embodiment, pixels within an (2n+1)×(2n+1) neighborhood are examined to ensure that the pixels are labeled consistently. If a pixel at location (i,j) is classified as belonging to smooth region and if all pixels within the (2n+1)×(2n+1) neighborhood centered on the pixel (i,j) are also classified as belonging to the smooth region, then the final classification for pixel (i,j) is that it does belong to the smooth region. But if all pixels in the neighborhood are not all classified as belonging to smooth region then the pixel is classified as not belonging to a smooth region.

Computations associated with performing the actions for method 700 can be repeated for different color channels. In one example, when content in a low bit depth domain is available in YCbCr form, then the computations can be done on the Y channel (luma channel) and the decisions of smooth versus non-smooth region found from luma channel calculations can be applied to the chroma channels Cb and Cr.

Figure 8:
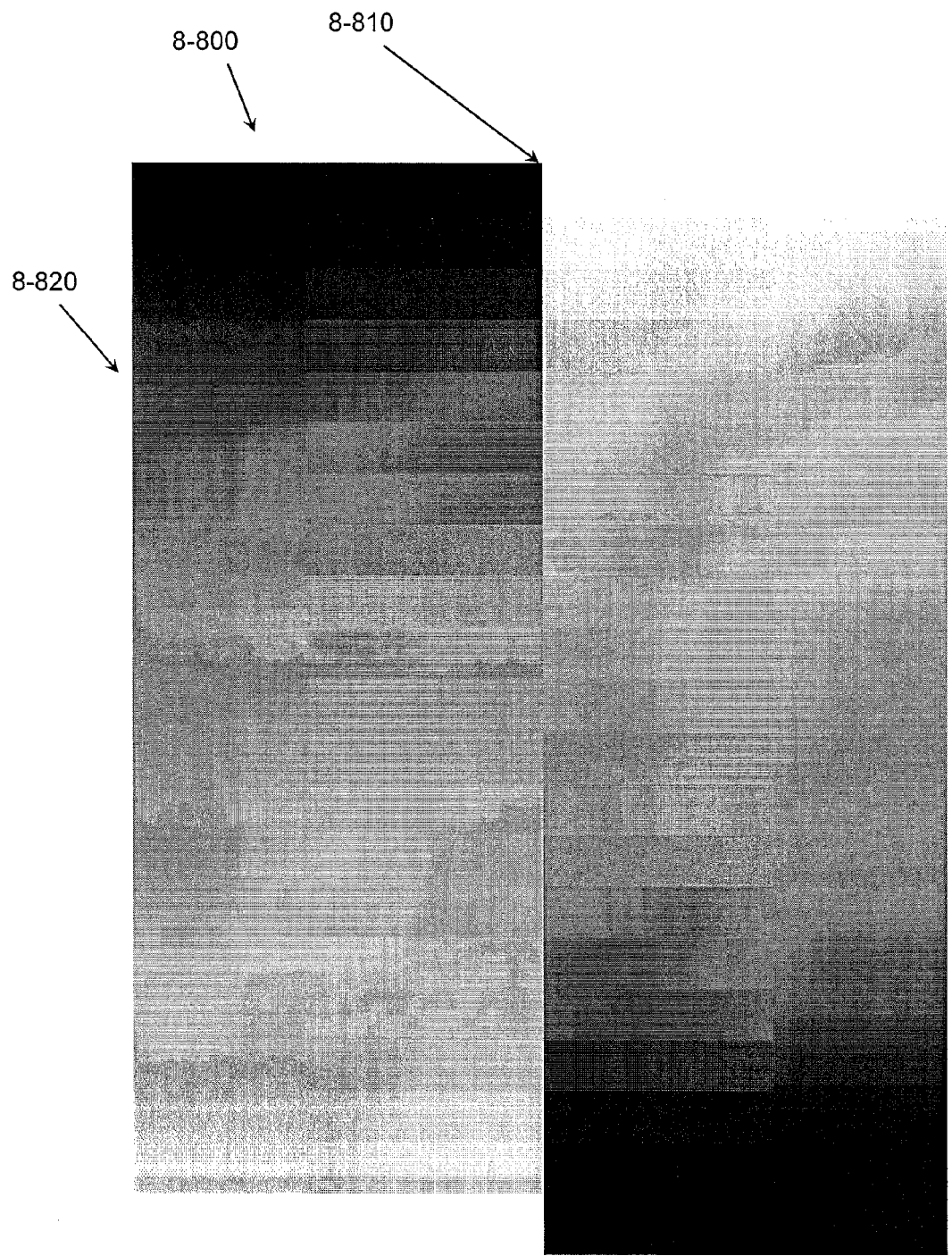
FIG. 8 illustrates an image 8-800 designed to illustrate the visibility of and then the mitigation of contour artifacts.

Sample images that illustrate contouring artifacts and the mitigation of contouring artifacts are now presented. FIG. 8 illustrates an image 8-800. The image 8-800 is designed to illustrate the visibility of and then the mitigation of contour artifacts. A center line 8-810 illustrates an edge between two portions of the image 8-800. It is desirable to keep edges where there are edges. A region 8-820 illustrates a large fairly homogenous area of gently varying grey scales.

Figure 9:
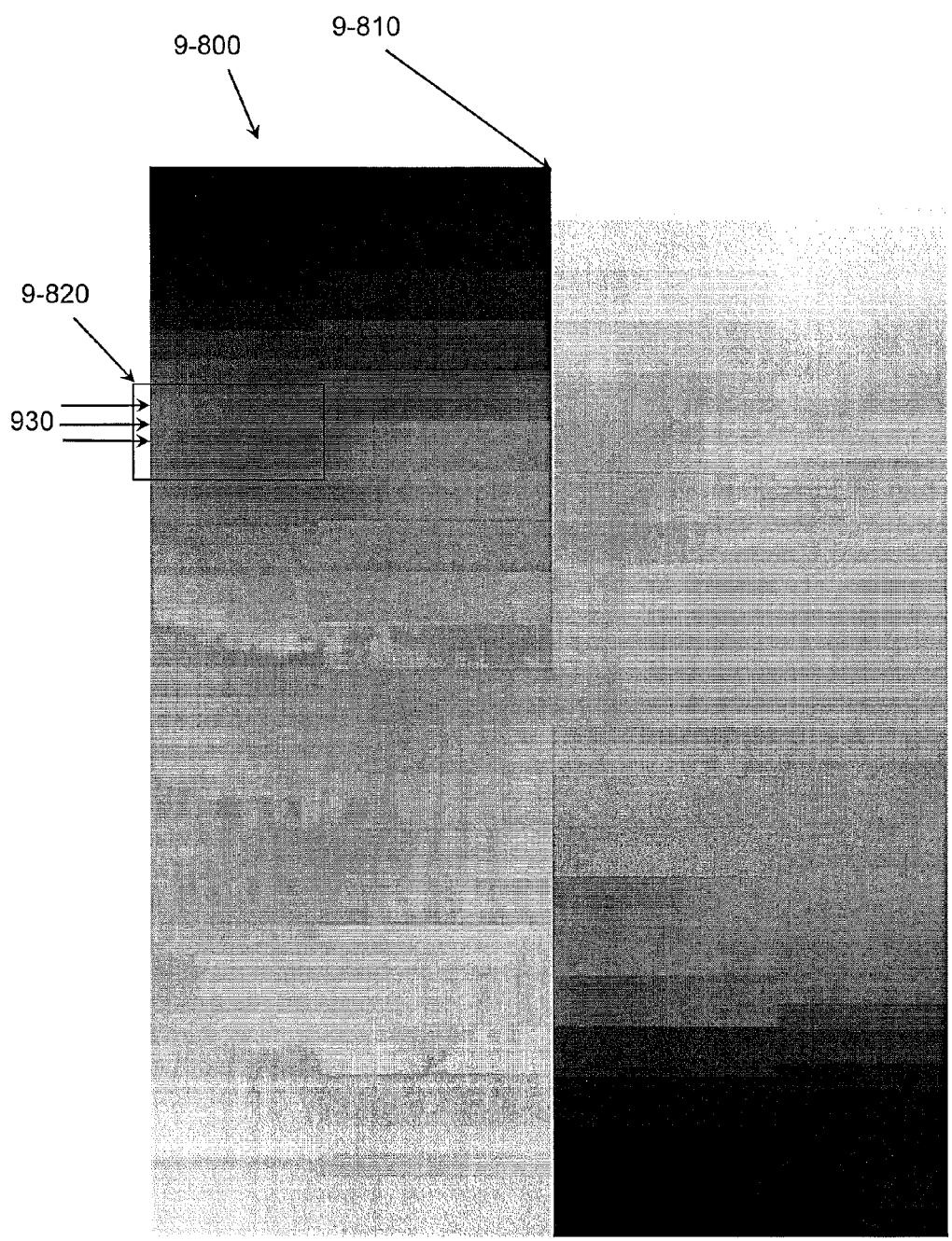
FIG. 9 illustrates what image 8-800 looks like when it is displayed using only 256 gray shades corresponding to 8 bits per channel.

FIG. 9 illustrates image 9-800. Image 9-800 is what image 8-800 looks like when it is based on using only 256 gray shades (corresponding to 8 bits per channel.) Centerline 9-810 retains its sharpness. However, region 9-820 exhibits contour artifacts 930. The contour artifacts 930 appear to introduce edges into an area that should be smooth, homogeneous, and gently varying.

The contouring artifacts are caused by the characteristics of the HVS which has a greater sensitivity at low levels of gray and therefore sees the darker portions of the gray scale ramp as a series of steps rather than the desired smooth ramp. The visibility of this stepping or contouring is more pronounced when the display has high brightness like that associated with liquid crystal displays. The contour artifacts are even more pronounced as the size of display devices increases. These artifacts are referred to as "false contours" because the ridges appear similar to topographic contours in a map. Example apparatuses and methods described herein facilitate high quality rendering of image and video content by reducing the false contour artifacts while augmenting the lower bit precision content to its higher bit precision representation.

Figure 11:
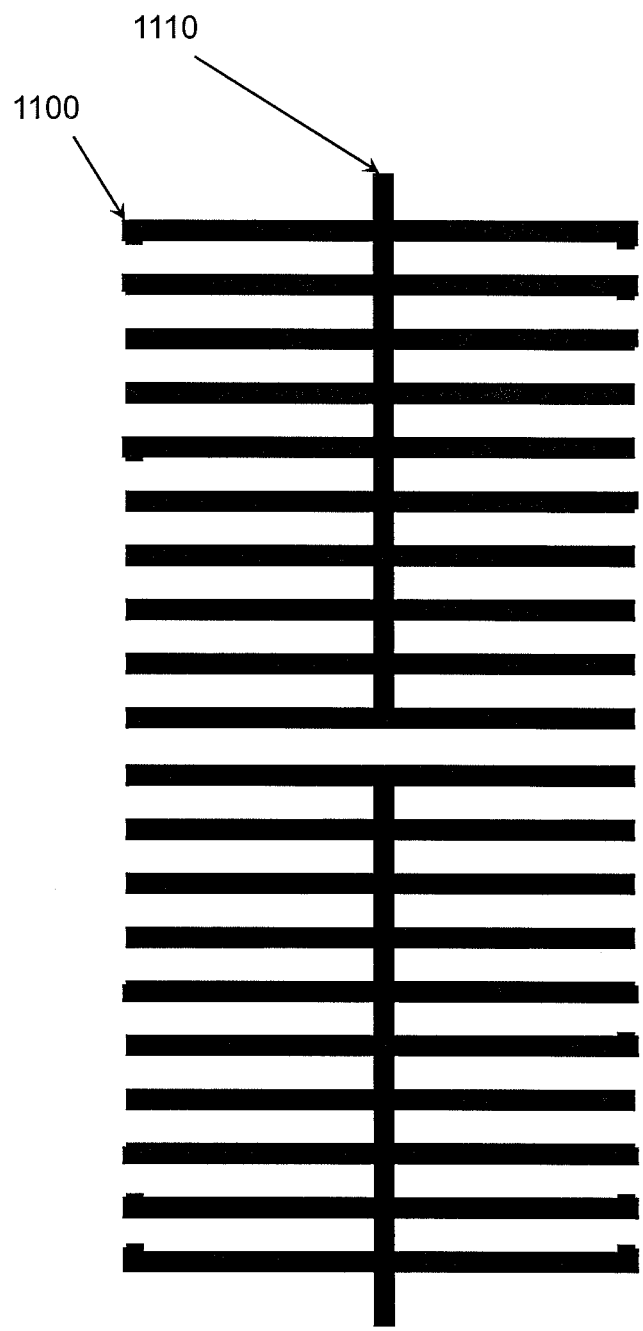
FIG. 11 illustrates edge pixels from the image in FIG. 8 that are identified and then not smoothed by example apparatuses and methods described herein.

To reduce contour artifacts, smooth regions in an original image may be identified. For example, region 8-820 may be identified as a "smooth" region. Example apparatuses and methods described herein selectively filter high-resolution pixels associated with the identified smooth regions. Example apparatuses and methods described herein do not filter high-resolution pixels associated with edges in exactly the same way that high-resolution pixels associated with smooth regions are filtered. Recall that edges are not located in smooth regions. Center line 8-810 is an example edge. Other edges also appear in image 8-800. The edges found in FIG. 8 are illustrated in FIG. 11. Center line 8-810 appears as center line 1110 in FIG. 11. The entire set of edges found in FIG. 8 are illustrated as edges 1100. These edges are clearly not "smooth" regions in image 8-800. Example apparatuses and methods described herein seek to maintain the sharpness of edges 1100 to prevent unintended blurring that is common with conventional systems.

Figure 10:
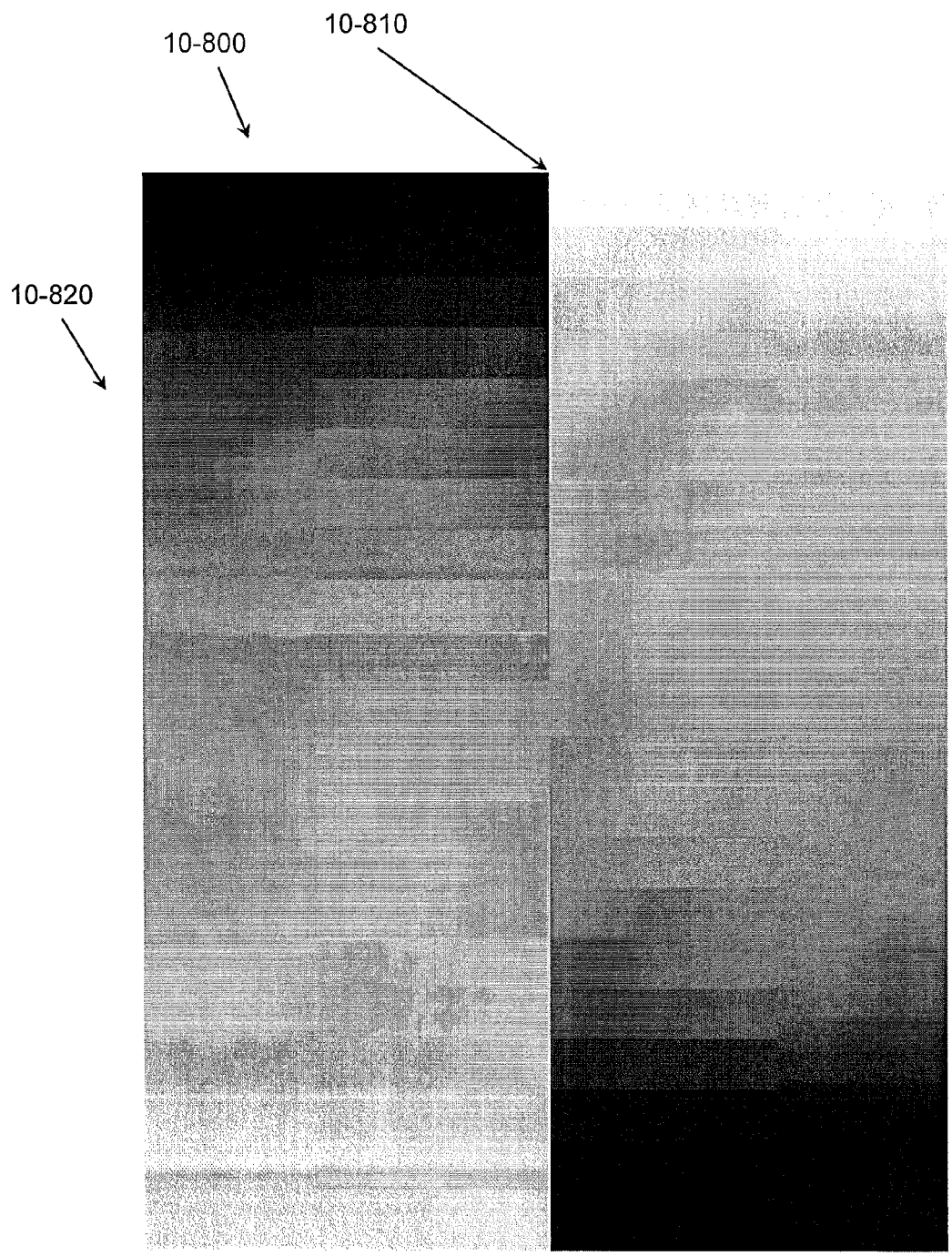
FIG. 10 illustrates the image from FIG. 8 after processing by example apparatuses and methods described herein and as displayed on an output device that can handle a greater bit depth than the initial lower bit depth.

FIG. 10 illustrates image 10-800. Image 10-800 illustrates image 8-800 as displayed on a higher resolution display after being processed by example apparatuses and methods. Note that while centerline 10-810 is retained, region 10-820 does not exhibit the contouring artifacts 930 that appeared in FIG. 9.

While example apparatuses, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

What is claimed is:

1. An apparatus, comprising:
    mapping logic configured to produce a high-resolution pixel from a low-resolution pixel;
    contour segmentation logic configured to classify the high-resolution pixel as being in a smooth region of an image based on at least one of a gradient value and a variance value associated with the low-resolution pixel;
    contour refinement logic configured to:
        identify a set of neighboring high-resolution pixels with respect to the high-resolution pixel; and
        selectively re-classify the high-resolution pixel as not being in the smooth region of the image when any pixels in the set of neighboring high-resolution pixels is classified as not being in the smooth region of the image; and
    range adjustment logic configured to selectively filter the high-resolution pixel based on whether the high-resolution pixel remains classified as being in the smooth region of the image,
    where the mapping logic is configured to produce the high-resolution pixel from the low-resolution pixel by operating on an individual color channel in a color space associated with the low-resolution pixel, and
    where the range adjustment logic is configured to selectively filter the high-resolution pixel in a different color channel of the color space.

2. The apparatus of claim 1, where the mapping logic is further configured to produce the high-resolution pixel from the low-resolution pixel according to a one-to-one mapping.

3. The apparatus of claim 1, where the mapping logic is further configured to produce the high-resolution pixel from the low-resolution pixel by performing one or more of, bit appending, zero padding, adaptive noise processing, quantizing processing, conversion processing, consulting a lookup table, employing a hash function, dithering, or half-toning.

4. The apparatus of claim 1, where the contour segmentation logic is further configured to calculate the gradient value based on change in pixel values in a line of pixels including the low-resolution pixel, where the line of pixels is confined to a neighborhood of pixels in the image.

5. The apparatus of claim 1, where the contour segmentation logic is further configured to calculate the variance value based on a difference amount between the low-resolution pixel and a set of related low-resolution pixels, where the set of related low-resolution pixels is confined to a neighborhood of pixels in the image.

6. The apparatus of claim 1, where the contour segmentation logic is further configured to classify the high-resolution pixel as being in the smooth region of the image upon determining that the gradient value is less than a gradient threshold and that the variance value is less than a variance threshold.

7. The apparatus of claim 6, where at least one of the gradient threshold and the variance threshold are user configurable.

8. The apparatus of claim 1, where the mapping logic is further configured to operate on an individual color channel associated with the low-resolution pixel.

9. The apparatus of claim 1, where the contour refinement logic is further configured to classify the high-resolution pixel as not being in the smooth region of the image as a function of at least one of the set of neighboring high-resolution pixels being classified as not being in the smooth region.

10. The apparatus of claim 1, where the range adjustment logic includes one or more of an adaptive low pass filter and an adaptive averaging filter that computes a filter value as a function of the average of related high-resolution pixels located in a line that includes the high-resolution pixel.

11. The apparatus of claim 1, where the mapping logic is configured to produce, on an intra-frame basis, a set of high-resolution pixels associated with a video stream from a set of low-resolution pixels.

12. A method, comprising:
    enhancing a bit depth representation of image content from a lower bit depth representation to a higher bit depth representation;
    initially classifying a pixel having the higher bit depth representation that is susceptible to producing a contouring artifact;

identifying a neighboring set of pixels having the higher bit depth representation associated with the initially classified pixel;

re-classifying the pixel as not being susceptible to producing the contouring artifact upon determining that one or more pixels in the neighboring set of pixels is not susceptible to producing the contouring artifact;

selectively filtering the pixel when the pixel remains classified as being susceptible to producing the contouring artifact to mitigate the contouring artifact, where re-classifying the pixel is based on luma channel data, and where selectively filtering the pixel is based on chroma channel data.

13. The method of claim 12, where enhancing the bit depth representation comprises one or more of, zero padding a pixel having the lower bit depth representation, performing adaptive noise processing on the pixel having the lower bit depth representation, acquiring a value from a lookup table, acquiring a value from a hash function, acquiring a value from a dithering function, and acquiring a value from a half-toning function.

14. The method of claim 12, where initially classifying the pixel having the higher bit depth representation comprises initially classifying the pixel having the higher bit depth representation as a function of gradient values and variance values associated with the pixel.

15. The method of claim 12, where selectively filtering the pixel comprises applying one or more of an adaptive low pass filter or an adaptive averaging filter to the pixel.

* * * * *